United States Patent [19]

Lemke et al.

[11] 4,339,775
[45] Jul. 13, 1982

[54] FAST FRAME RATE AUGMENTATION

[75] Inventors: James U. Lemke, Del Mar; James A. Bixby, San Diego, both of Calif.

[73] Assignee: Eastman Technology, Inc., Rochester, N.Y.

[21] Appl. No.: 159,424

[22] Filed: Jun. 16, 1980

[51] Int. Cl.³ .................... H04N 5/785; H04N 3/14
[52] U.S. Cl. ..................................... 360/10; 358/213
[58] Field of Search ............... 360/9, 10, 11, 33, 35; 358/212, 213, 105, 134, 137, 127

[56] References Cited

U.S. PATENT DOCUMENTS

| 3,911,467 | 10/1975 | Levine et al. ............ 358/213 X |
| 4,057,836 | 11/1977 | Munsey .................... 358/134 X |
| 4,064,540 | 12/1977 | Jetten ....................... 358/127 X |
| 4,127,877 | 11/1978 | Morishita et al. ........ 358/213 |

FOREIGN PATENT DOCUMENTS 2751274  5/1979  Fed. Rep. of Germany ......... 360/9

OTHER PUBLICATIONS

Mayes et al., "High-Speed Image Capture for Mechanical Analysis", IBM Tech. Dis. Bull., vol. 16, No. 7, Dec. 1973, pp. 2169-2171.

Primary Examiner—Bernard Konick
Assistant Examiner—Donald McElheny, Jr.
Attorney, Agent, or Firm—Robert F. Cody

[57] ABSTRACT

Fast frame recorder apparatus is known wherein information corresponding to an object of interest is recorded at a fast frame rate (e.g., 2,000 frames per second) and displayed at a slower frame rate (e.g., 60 frames per second) to produce a slow motion replay of the object. In accordance with the present disclosure, such apparatus is so modified that information corresponding to the object of interest is sampled a plurality of times for each recorded frame to provide an increased frame rate (e.g., 12,000 frames per second) with respect to the object of interest.

3 Claims, 16 Drawing Figures

6X PARTIAL-FRAME MODE

3X PARTIAL-FRAME MODE

2X PARTIAL-FRAME MODE

FIG. 7a

| SPEED REDUCTION | CAMERA FRAME RATE (fps) | N | RECORD TAPE SPEED (ips) | PLAYBACK TAPE SPEED (ips) |
|---|---|---|---|---|
| 33 | 2,000 | 1 | 200 | 6 |
| 17 | 1,000 | 2 | 100 | 6 |
| 8 | 500 | 4 | 50 | 6 |
| 3 | 200 | 10 | 20 | 6 |
| 1 | 60 | 33 | 6 | 6 |

FIG. 7b

| N | fc (MHz) (RECORD) | Δf (MHz) (RECORD) |
|---|---|---|
| 1 | 5 | 1.6 |
| 2 | 2.5 | 0.8 |
| 4 | 1.25 | 0.4 |
| 10 | 0.5 | 0.16 |
| 33 | 0.15 | 0.05 |

FIG. 7c

| | RECORD | | | | PLAYBACK | | | |
|---|---|---|---|---|---|---|---|---|
| SPEED REDUCTION | FRAME RATE (fps) | fc (MHz) | Δf (MHz) | TAPE SPEED (ips) | TAPE SPEED (ips) | fc (MHz) | Δf (MHz) | FRAME RATE (fps) |
| 33 | 2,000 | 5 | 1.6 | 200 | 6 | 0.15 | 0.05 | 60 |
| 17 | 1,000 | 2.5 | 0.8 | 100 | 6 | 0.15 | 0.05 | 60 |
| 8 | 500 | 1.25 | 0.4 | 50 | 6 | 0.15 | 0.05 | 60 |
| 3 | 200 | 0.5 | 0.16 | 20 | 6 | 0.15 | 0.05 | 60 |
| 1 | 60 | 0.15 | 0.05 | 6 | 6 | 0.15 | 0.05 | 60 |

FIG. 9 DIVIDE-BY-N CIRCUIT

FAST FRAME RATE AUGMENTATION

FIELD OF THE INVENTION

The present invention relates to fast frame rate recorder apparatus and, more particularly to apparatus for producing an effective recording frame rate that is many times higher than the actual recording frame rate.

DESCRIPTION RELATIVE TO THE PRIOR ART

It is often desirable to study fast moving phenomena in slow motion. For example, in a manufacturing process that uses high speed machinery, malfunctions can occur which can be analyzed directly only by viewing the process at a greatly reduced speed. Another instance wherein slow motion studies are helpful is in trajectory analysis of a rapidly moving object (such as a bullet). Further applications of slow motion include the testing of athletic equipment, the analysis of short duration events (such as a vehicle collision conducted under test conditions), and the design of safety equipment.

A technique having more general application is high speed photography wherein the object being studied is optically imaged onto a photographic film that is being advanced at an extremely fast rate (thousands of inches per second). Commonly, a rotating polygon mirror is used in the optical system to provide frame rates as high as 20,000 frames per second. High speed photography would have more widespread applicability were it not for certain limitations: (1) Analysis of a transient event that occurs at an unknown time tends to be impractical because of the large amount of film that would be required. For example, were it necessary to operate a high speed photographic camera for one hour before the event occurs, approximately 60 miles of photographic film would be required (assuming 16 mm film and a frame rate of 2,000 frames per second). (2) Photographic film is non-reusable. (3) Photographic film does not provide instant accessability; instead, it must be processed before viewing, a property that renders it unsuitable for applications wherein immediate analysis is required. (4) Storing image data on photographic film makes computer analysis of recorded data difficult. This disadvantage is particularly important in applications such as automated trajectory analysis, and applications requiring computerized image enhancement. A major advantage of high speed photography apart from its extremely fast frame rate, however, is that it provides television comparable resolution.

An alternative approach to photographic fast frame recording is the use of an electronic camera that includes a solid-state area image sensor and a magnetic recording device. Such an electronic camera would possess extreme versatility, offering several advantages over the photographic system described above. For example, because magnetic tape is reusable, it is cost effective even though used in large quantities for a particular application. In addition, magnetic tape provides immediate playback and is compatible with computer analysis.

Fast frame recording apparatus is known (see, for example, *Research Disclosure*, Vol. 199, Publication No. 19919, November 1980, published by Industrial Opportunities Ltd., Homewell, Havant, Hampshire, P09 1EF, UK) that combines the high resolution of a photographic film-based system with the versatility of an electronic camera. Such fast frame recorder apparatus records scene information at a first frame rate and plays back the scene information at a second and slower frame rate for display on a video monitor, thereby producing a slow motion replay of the scene information. Means are provided for selecting the speed reduction at which it is desired to display scene information on a video monitor that operates at a predetermined display frame rate. A camera, operated at a frame rate equal to the selected speed reduction times the display frame rate, produces a signal representative of scene information. This signal is converted to a frequency modulated signal having a center frequency and a frequency deviation that vary in proportion to the selected speed reduction. The modulated camera signal is recorded and played back by a magnetic recording device that is operated such that the ratio of the recording tape speed to the playback tape speed equals the selected speed reduction. The played back signal, after processing, is displayed on the video monitor, thereby producing a slow motion display of scene information at the selected speed reduction.

SUMMARY OF THE INVENTION

The present invention provides apparatus for increasing the frame rate, with respect to an object of interest, at which scene information is recorded by fast frame recorder apparatus of the type discussed above. Specifically, in the case where an object of interest occupies only a part of a frame of video information, the camera image sensor is read out in such a manner that a plurality of partial frames are displayed during each whole frame. The result is a partial-frame rate with respect to the object of interest that is greater than the whole-frame rate by a factor equal to the number of partial frames displayed per whole frame.

BRIEF DESCRIPTION OF THE DRAWINGS

In the detailed description of the preferred embodiments of the invention presented below, reference is made to the accompanying drawings in which:

FIGS. 7a, 7b and 7c show the relationship between various operational parameters of the fast frame recorder shown in FIG. 1.

DETAILED DESCRIPTION OF THE PREFERRED EMBODIMENTS

In accordance with a presently preferred embodiment, a fast frame recorder is provided that records scene information at a fast frame rate and plays back such information at a slower frame rate, thereby allowing slow motion analysis of a moving object. The camera whole-frame rate used for recording scene information is variable between 60 and 2,000 frames per second. For those applications requiring even faster frame rates, a partial-frame mode of operation is provided that enables scene information to be recorded at a partial-frame rate equal to two, three or six times the whole-frame rate. Played back scene information is displayed on a video monitor operating at 60 times per second. Accordingly, the apparent speed at which an object moves when viewed upon playback will be reduced by a factor equal to the ratio of the recording (whole or partial-) frame rate to the playback frame rate. Thus, the maximum whole-frame speed reduction is about 33 (2,000 divided by 60) while the maximum partial-frame speed reduction is 200 (12,000 divided by 60). At the maximum partial-frame speed reduction, the exposure time for each frame is 1/12,000th of a second, which is short enough to provide extremely high resolution images (almost no image smear) of even rapidly moving objects.

Figure 1:
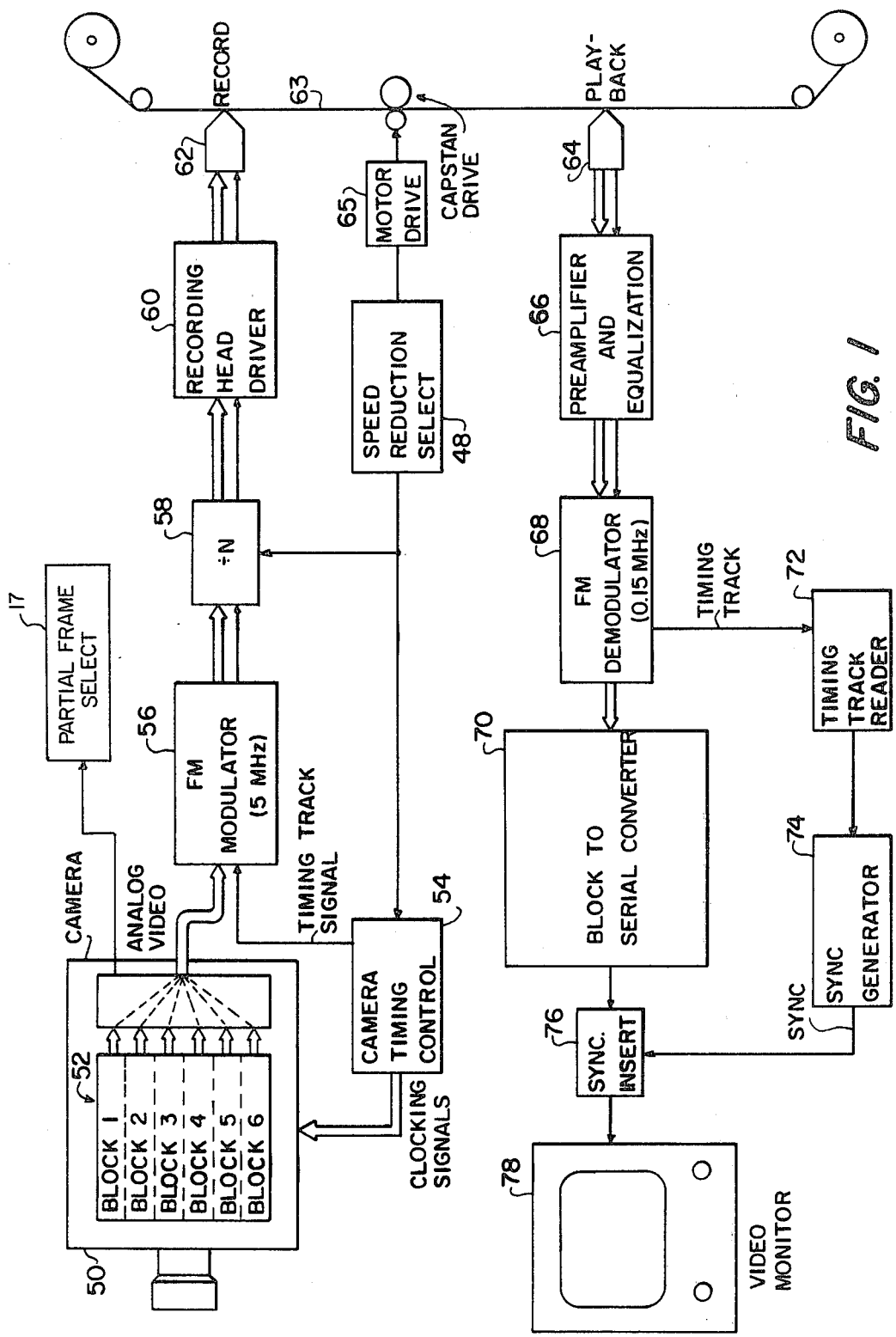
FIG. 1 is a functional block schematic diagram of a fast frame recorder in accordance with the present invention.

FIG. 1 is a functional block schematic diagram showing a fast frame recorder in accordance with a presently preferred embodiment of the invention. Initially, the operator selects the desired whole-frame speed reduction by means of a speed reduction select circuit 48. Based upon the selected reduction, a camera timing control circuit 54 generates the various clocking signals required to read out a sensor 52 in a camera 50 at a frame rate in accordance with TABLE I:

TABLE I

| SPEED REDUCTION | FRAME RATE (frames per second) |
| --- | --- |
| 33 | 2,000 |
| 17 | 1,000 |
| 8 | 500 |
| 3 | 200 |
| 1 | 60 |

The sensor 52 is a "block" readable area image sensor. The basic concept of block readout of a solid state area image sensor is disclosed in U.S. patent application Ser. No. 112,483, filed Jan. 16, 1980 in the name of James A. Bixby, which is hereby incorporated by reference. Specific types of block readable sensors are disclosed in U.S. patent application Ser. No. 112,482, filed Jan. 16, 1980 in the names of T. H. Lee and R. P. Khosla, and U.S. patent application Ser. No. 116,686, filed Jan. 30, 1980 in the names of C. N. Anagnostopoulos et al, both of which are hereby incorporated by reference.

Figure 2:
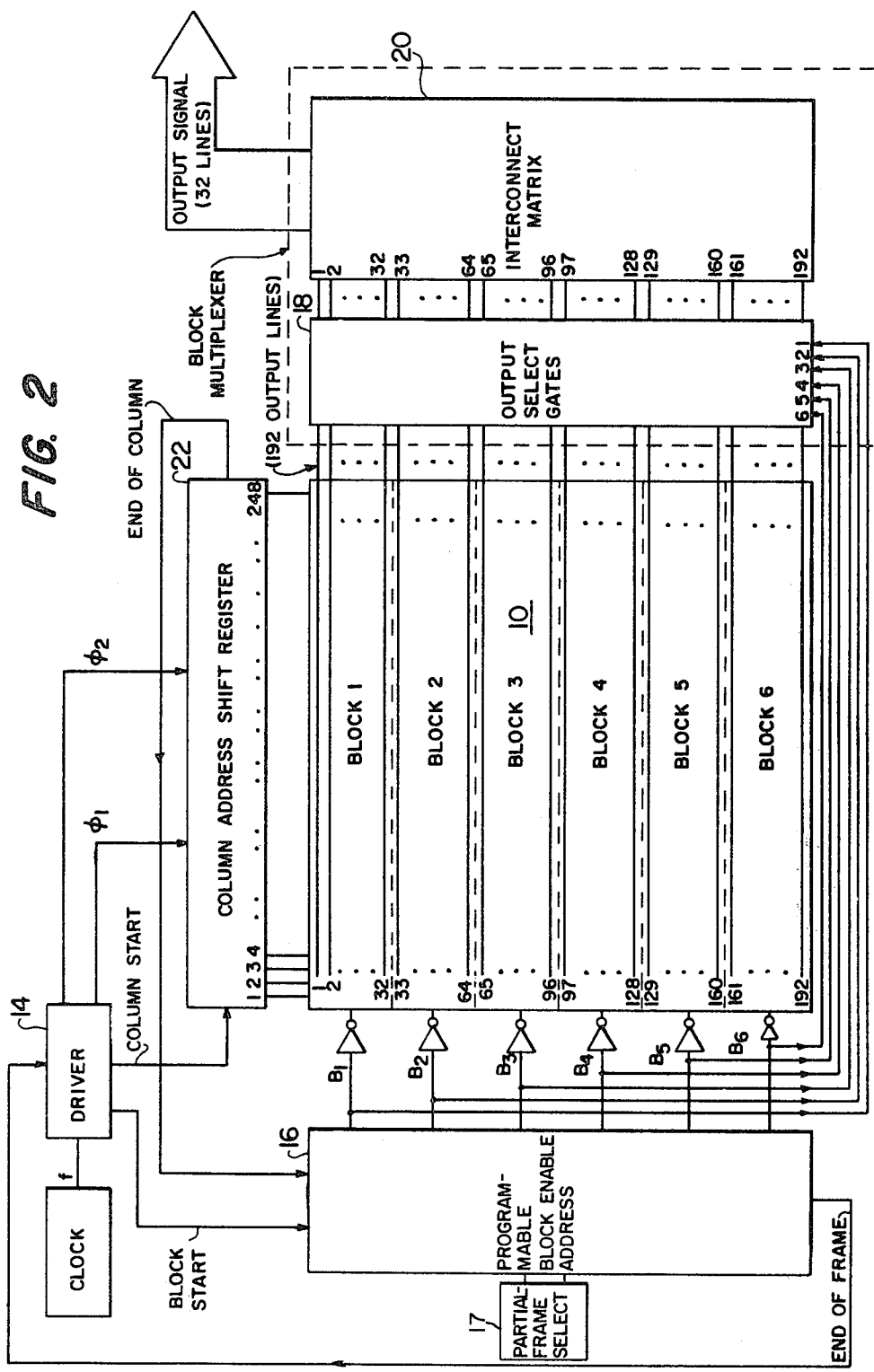
FIG. 2 is a functional block schematic diagram of a block readable area image sensor.
Figure 3:
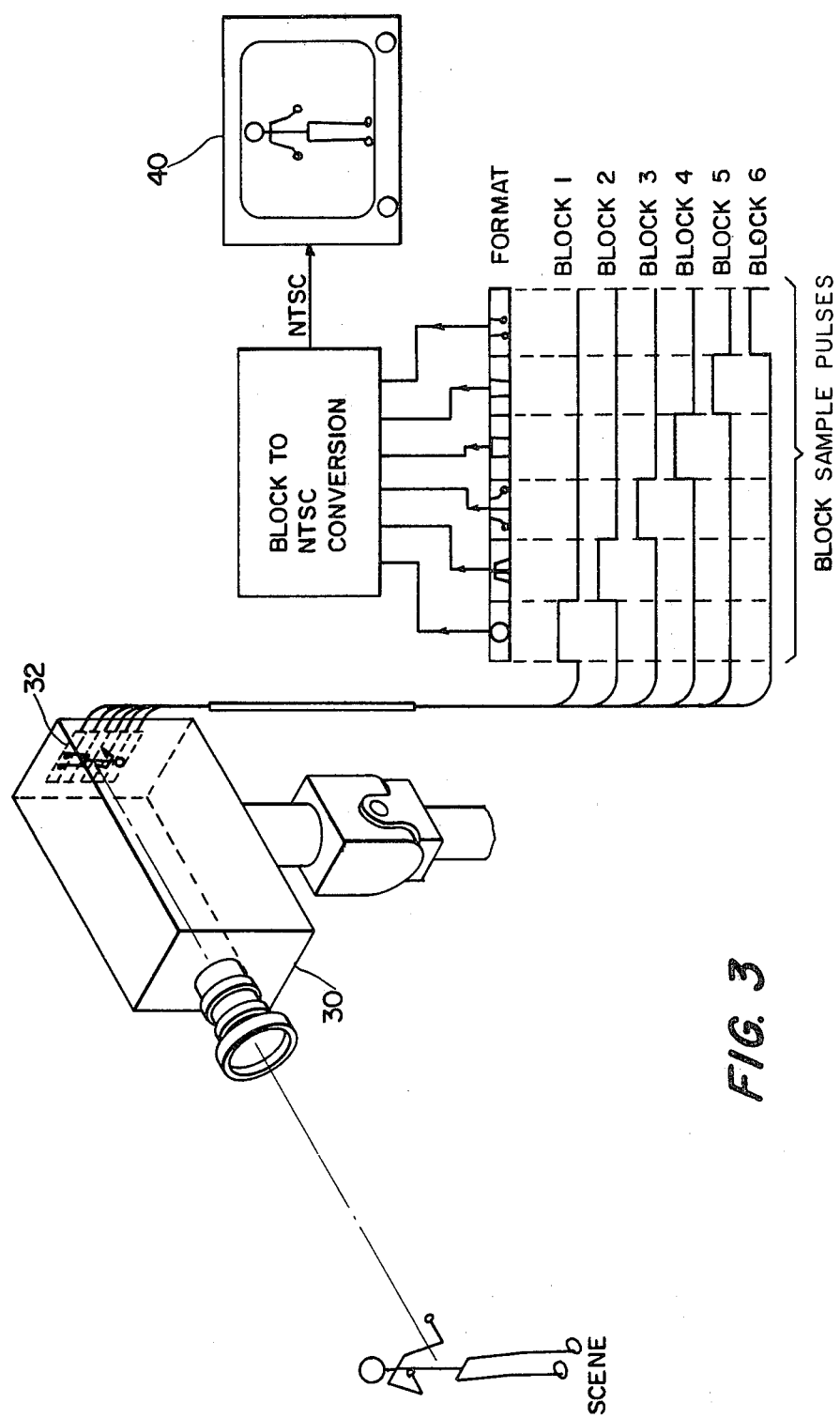
FIG. 3 illustrates, graphically, the concept of video recording using a block readable area image sensor.

Although the referenced patent applications include detailed information, the basic concept of block readout is illustrated in FIGS. 2 and 3. FIG. 2 shows a block readable sensor 10 that is comprised of an array of photosites (not shown individually) arranged in 192 rows and 248 columns. For purposes of readout, the sensor 10 is formatted into six blocks of 32 photosite rows each. (There need not be any physical demarcation on the sensor itself between such blocks). Each photosite is readable upon the application thereto of an enablement signal and an address signal. The sensor 10 is readable in whole or partial frames. To begin whole-frame readout, a driver 14 produces a BLOCK START signal that causes a programmable block enable address generator 16 to produce an enablement signal that enables, via block enable line $B_1$, all photosite rows within block 1, i.e, rows 1-32. In response to a COLUMN START signal, column address electronics in the form of a shift register 22 sequentially addresses the 248 photosite columns of the entire area image sensor 10. Because the photosite rows within blocks 2-6 (rows 33-192) are not enabled, only photosite rows 1-32 (block 1) are read out at this time, the remaining photosites in the not-enabled blocks continuing to integrate charge in response to incident radiation. After all columns have been addressed, an END OF COLUMN signal sequences the block enable address generator 16 to enable, via block enable line $B_2$, the block 2 photosite rows, i.e., rows 33-64. Column-wise readout then proceeds as described above for the block 1 photosite rows. This process is repeated until all 6 blocks of photosite rows are read out, at which time an END OF FRAME signal from the block enable address generator 16 resets the driver 14 for readout of the next frame.

Output select gates 18 and an interconnect matrix 20 of conductive bus lines perform the function of a block mulitplexer that causes only signals from the 32 photosite rows within the block that is being read out to appear as an output signal. The reader is referred to U.S. patent application Ser. No. 112,482, referenced above, for a more detailed discussion of the output select gates 18 and the interconnect matrix 20.

As a result of such readout, block information is produced in series, with each block of information containing 32 row signals arranged in parallel. A result of such a readout technique is the reduction of the time required for sensor readout by a factor of 32 (i.e., the number of photosite rows in a block). Attendantly, a sensor that can be read out at a maximum whole-frame rate of, say, 60 frames per second using conventional serial line readout can be read out at a whole-frame rate of 1920 frames per second when operation is as described above.

FIG. 3 illustrates, graphically, how frame information, formatted in blocks as described above, may be recombined to form a video display. A camera 30 images a scene onto the photosensitive surface of a block readable area image sensor 32. By reading out the sensor in blocks, the scene is "sampled", in effect, by "block sample pulses". The frame information (labelled FORMAT) corresponding to each block is shown in "pictorial form" above its respective block sample pulse. The block format frame information is converted to a standard NTSC television signal (or other suitable format) and applied to a video monitor 40. The scene can then be displayed on the video monitor 40.

Partial-frame readout is controlled by a partial-frame select circuit 17 (see FIG. 2) which may be set to a two bit address, whereby four partial-frame modes of operation are provided, referred to hereinafter as 1×, 2×, 3× and 6×. The 1× mode corresponds to whole-frame operation as described above. In the 2× mode, the programmable block enable address generator 16 enables each of the blocks 3, 4 and 5 twice per frame. In the 3× mode, blocks 3 and 4 are each enabled three times per frame; and in the 6× mode, block 3 is enabled six times per frame. Such block enablement produces partial-frame rates of 2, 3 or 6 times the selected whole-frame rate.

Figure 4:
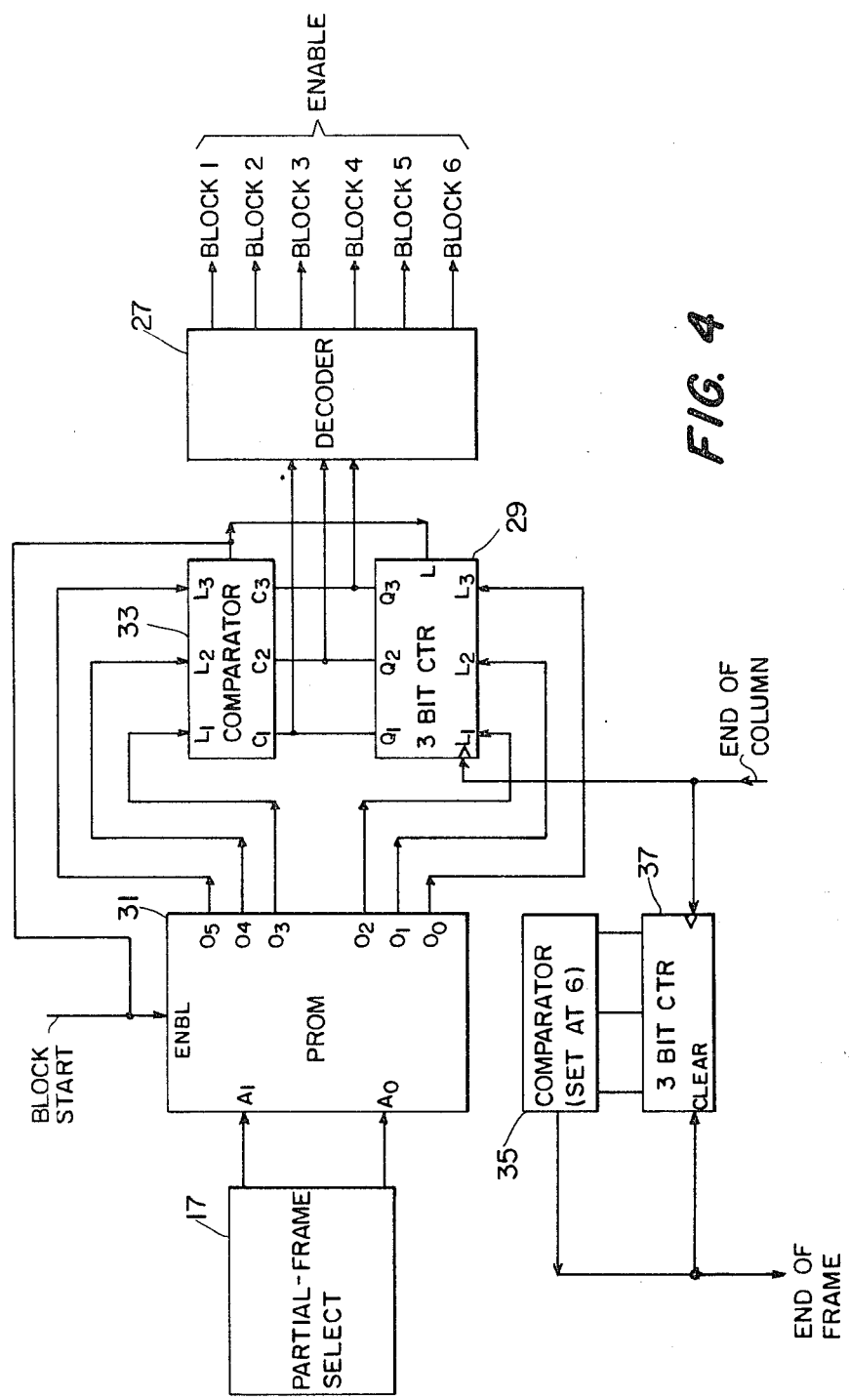
FIG. 4 is a functional block schematic diagram of a circuit for use in selecting the partial frame mode of operation.

FIG. 4 shows an electrical schematic diagram of the programmable block enable address generator 16. A decoder 27 produces a block enable signal for the block number that corresponds to the count of a 3-bit counter 29. The count of the counter 29 is controlled by a PROM 31 and a comparator 33. The output data from the PROM 31 is determined by the selected partial-frame mode of operation:

TABLE II

| Partial-Frame Mode | PROM Data Outputs | | | | | |
|---|---|---|---|---|---|---|
| | $O_0$ | $O_1$ | $O_2$ | $O_3$ | $O_4$ | $O_5$ |
| 1X | 0 | 0 | 1 | 0 | 1 | 1 |
| 2X | 0 | 1 | 1 | 1 | 0 | 1 |
| 3X | 0 | 1 | 1 | 0 | 1 | 0 |
| 6X | 0 | 1 | 1 | 1 | 1 | 0 |

Figure 5:
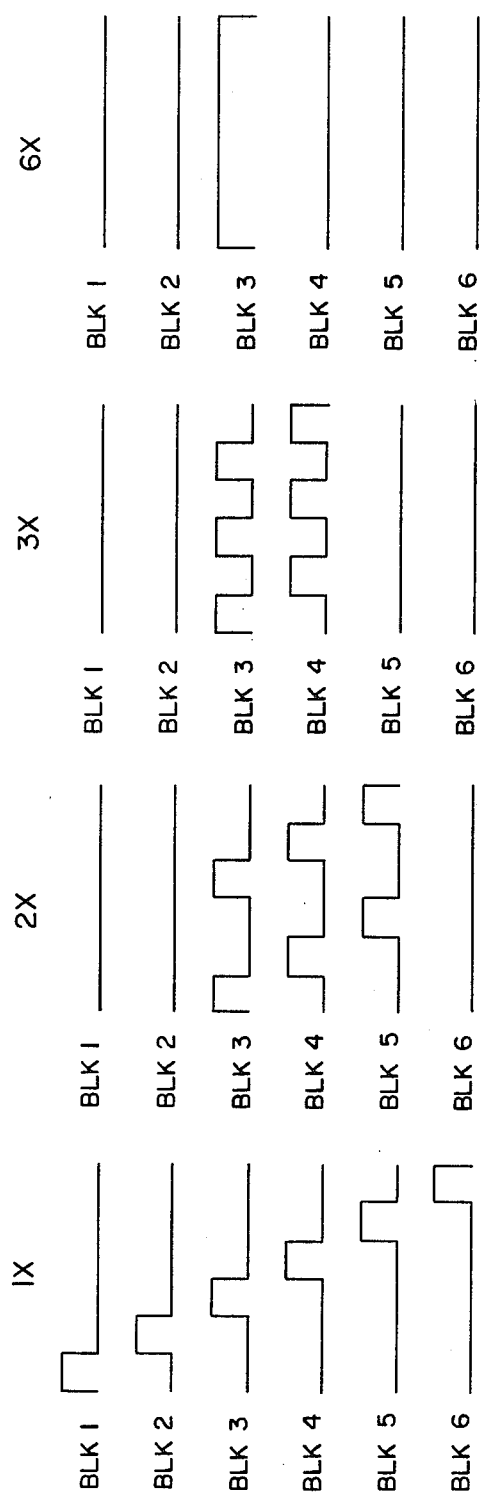
FIG. 5 is a timing diagram showing block enable signals for various partial frame modes of operation.
Figure 6A:
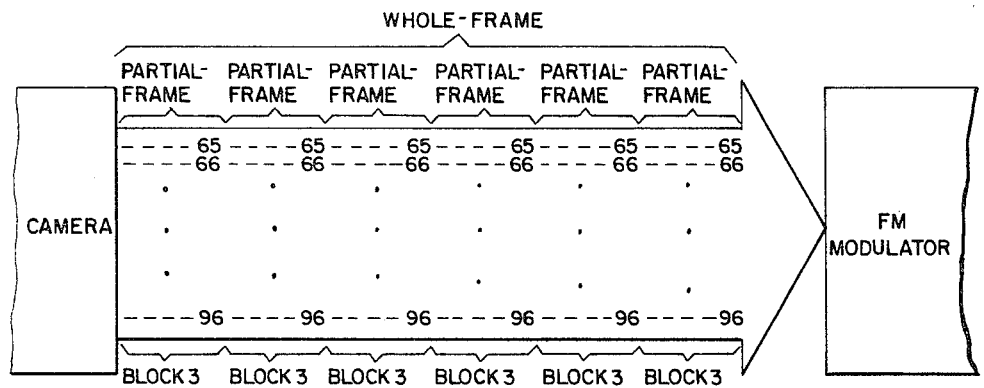
FIGS. 6a, 6b and 6c show the format of signals produced by a camera in various partial frame modes of operation.
Figure 6B:
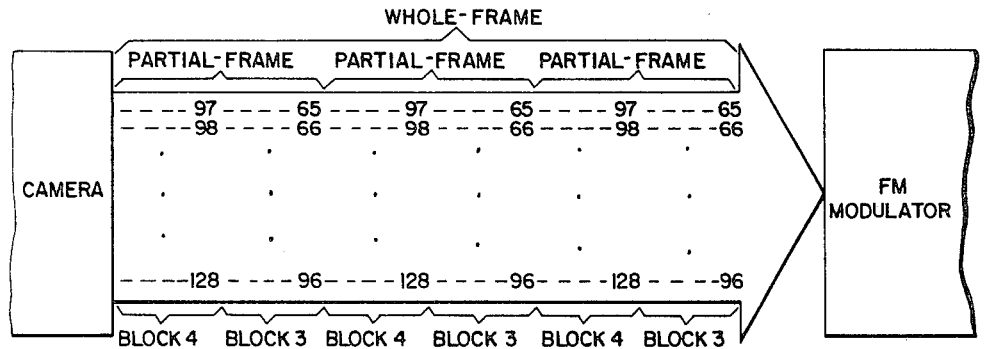
Figure 6C:
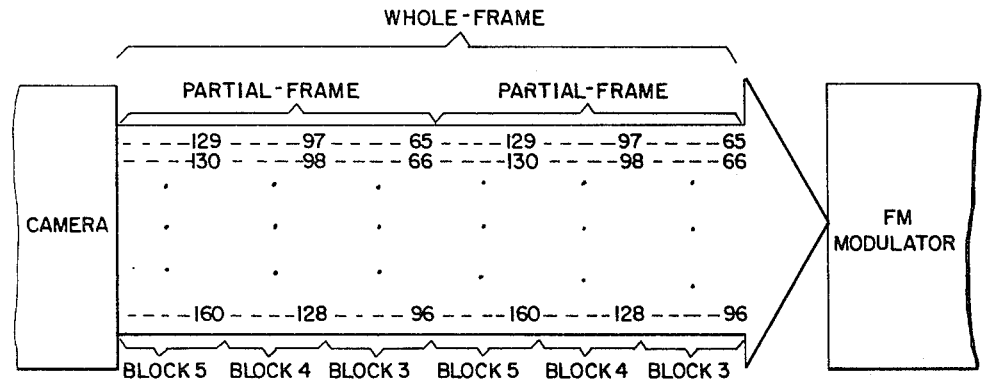

In terms of numerical equivalents, selection of the 1× partial-frame mode causes a "one" to be applied to the load inputs of the counter 29 and a "six" to be applied to the comparator 33. Selection of the 2×, 3×, and 6× partial-frame modes causes a "three" to be applied to the load inputs of the counter 29 and a "five", "four" or "three", respectively, to be applied to the comparator 33. The counter 29, therefore, repeatedly increments from the count applied to its load inputs to the count applied to the comparator 33. The resultant block enable signals for each of the selectable partial-frame modes are shown in FIG. 5. It is apparent from inspection of FIG. 5 that the 1× partial-frame mode is equivalent to whole-frame operation, while the 6× partial-frame mode results in readout of block three six times for each frame, thereby resulting in a partial-frame rate that is six times greater than the whole-frame rate. The corresponding formats of the signals produced by the camera 30 for the 2×, 3× and 6× partial-frame modes are shown in FIGS. 6a, 6b and 6c, respectively.

The END OF FRAME signal is produced by a comparator 35 that produces an output signal each time a counter 37 counts six END OF COLUMN signals.

Referring again to FIG. 1, each of the 32 line signals that constitute the analog video signal from the camera is frequency modulated, in an FM modulator circuit 56, on a carrier having a center frequency of 5 MHz. It will be assumed, for purposes of illustration, that the frequency deviation is ±1.6 MHz. A timing signal containing sync information is also frequency modulated on a 5 MHz carrier. The output of the FM modulator circuit 56 is, therefore, comprised of 33 separate, frequency modulated signals.

Figure 9:
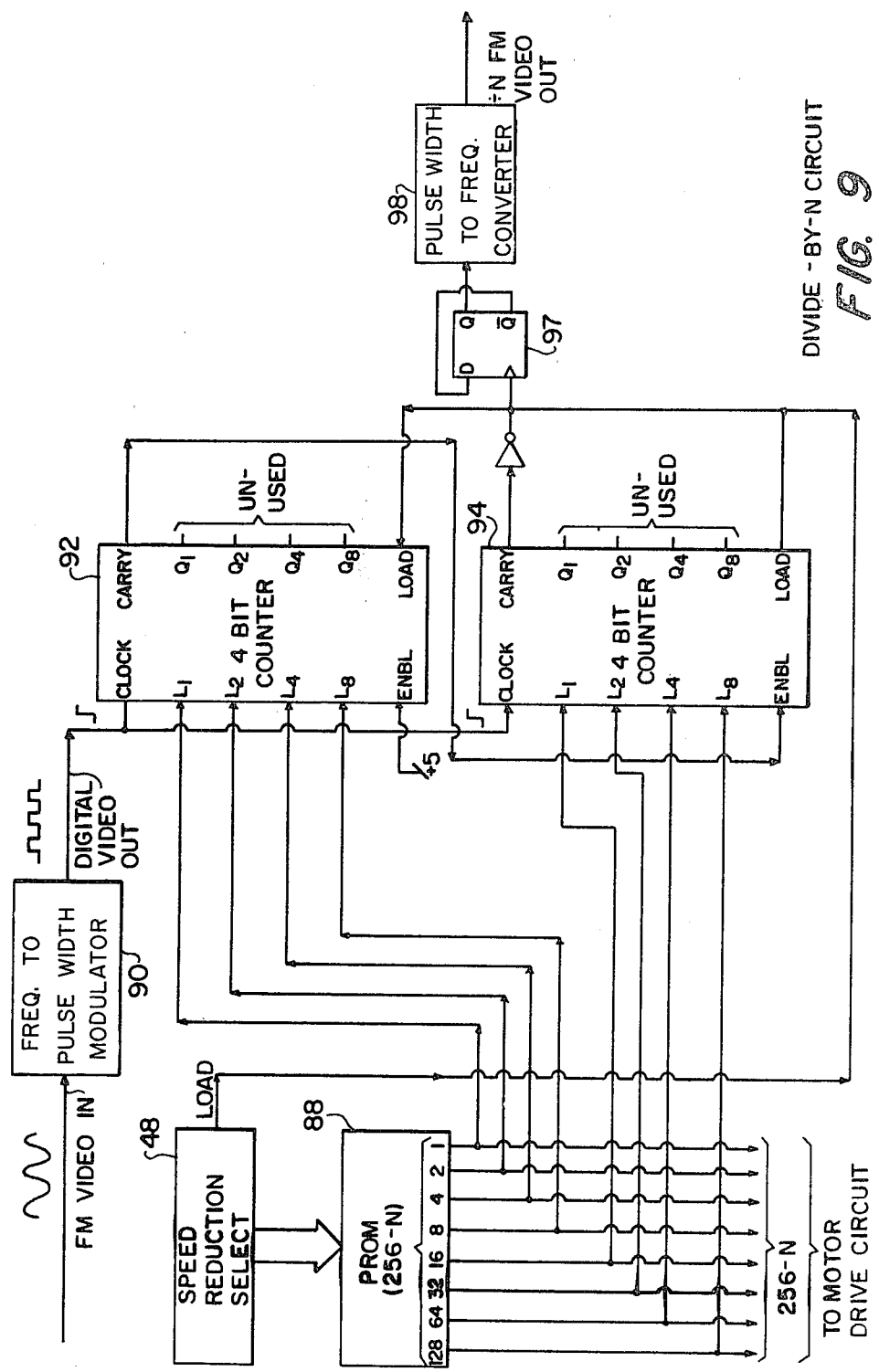
FIG. 9 is an electrical schematic diagram of a divide-by-N circuit used in the fast frame recorder shown in FIG. 1.

All 33 frequency modulated signals undergo a divide-by-N process in a divide-by-N circuit 58, described in detail with reference to FIG. 9. The value of "N" is equal (to the nearest integer) to the maximum selectable speed reduction divided by the selected speed reduction. The relationship between "N" and various values of the speed reduction is given in TABLE III:

TABLE III

| SPEED REDUCTION | N |
|---|---|
| 33 | 1 |
| 17 | 2 |
| 8 | 4 |
| 3 | 10 |

TABLE III-continued

| SPEED REDUCTION | N |
|---|---|
| 1 | 33 |

It will be noted that the selected speed reduction has been used to determine both the frame rate at which the sensor 52 is read out (see Table I) and the value of "N" in the divide-by-N circuit 58 (see Table III). While it may not be apparent how these two parameters (frame rate and "N") relate to slow motion replay, the discussion which follows will show that the selection of these two parameters as described above, in conjunction with the proper selection of a third parameter (recording tape speed), will produce the desired speed reduction of scene information upon playback and greatly simplify the associated signal processing circuitry.

The output signals of the divide-by-N circuit 58 are applied to a recording head driver circuit 60 that drives a multi-channel longitudinal recorder that includes a 33 channel magnetic recording head 62. The 33 signals are recorded along 33 separate tracks on a magnetic tape 63. The magnetic tape 63 is advanced by a capstan drive that is controlled by a motor drive circuit 65, described in detail with reference to FIGS. 10 and 11. The speed at which the magnetic tape 63 is advanced during recording is selected, in accordance with the invention, to be proportional to the selected speed reduction. One set of the recording tape speeds for the selectable speed reductions is given in TABLE IV:

TABLE IV

| SPEED REDUCTION | RECORDING TAPE SPEED (inches per second) |
|---|---|
| 33 | 200 |
| 17 | 100 |
| 8 | 50 |
| 3 | 20 |
| 1 | 6 |

Having recorded information on the magnetic tape 63 that corresponds to the moving object (scene information) under study, a slow motion video display of such object is produced by playing back the recorded information at a constant tape speed of 6 inches per second, irrespective of the originally selected speed reduction. As a result, the ratio of the recording tape speed to the playback tape speed yields a tape speed reduction ratio that equals the selected speed reduction. Further, all reproduced signals have the same center frequency ($f_c$) and frequency deviation ($\Delta f$), thereby enabling a fixed frequency demodulator to be used irrespective of the selected whole-frame speed reduction. To understand why the above-described selection of recording frame rate, the factor "N", recording tape speed and playback tape speed results in the desired speed reduction and signal form upon playback, reference is made to FIGS. 7a through 7c. For convenience, the various speed reductions and the parameters whose values are determined thereby are summarized in FIG. 7a. It is apparent from inspection of FIG. 7a that "N" is equal to the maximum selected camera frame rate divided by the selected camera frame rate (which is determined by the speed reduction, as discussed above). The effect of the divide-by-N circuit 58 is to reduce both the center frequency and the frequency deviation by a factor of "N", as summarized in FIG. 7b. But because the ratio of record tape speed to playback tape speed varies in inverse proportion to "N", all signals produced upon playback have the same center frequency ($f_c = 0.15$ MHz) and frequency deviation ($\Delta f = 0.05$ MHz); see FIG. 7c. Further, because the playback tape speed is always 6 inches per second, all video information is reproduced at a frame rate of 60 frames per second, thereby resulting in the desired whole-frame speed reduction.

As a specific example, assume that a whole-frame speed reduction of 8 is selected. (For this example, reference is made to FIGS. 1 and 7a through 7c.) Selecting a whole-frame speed reduction of 8 will cause the camera sensor 52 to be read out at a whole-frame rate equal to 500 frames per second (FIG. 7a). The FM modulator 56 frequency modulates the video signal into a 5 MHz carrier to produce a frequency modulated video signal having a center frequency equal to 5 MHz and a frequency deviation equal to 1.6 MHz. The divide-by-N circuit 58, with N=4, reduces the frequency content of the video signal information by a factor of 4, thereby resulting in a frequency modulated signal having a center frequency equal to 1.25 MHz and a frequency deviation of 0.4 MHz (FIG. 7b). This signal is recorded at a tape speed of 50 inches per second. Playing back this signal at a tape speed of 6 inches per second results in a recovered signal that has a center frequency equal to 0.15 MHz, a frequency deviation equal to 0.05 MHz, and a frame rate of 60 frames per second (FIG. 7c). The desired whole-frame speed reduction of 8 (more precisely, 8.25) has thus been achieved.

Figure 8:
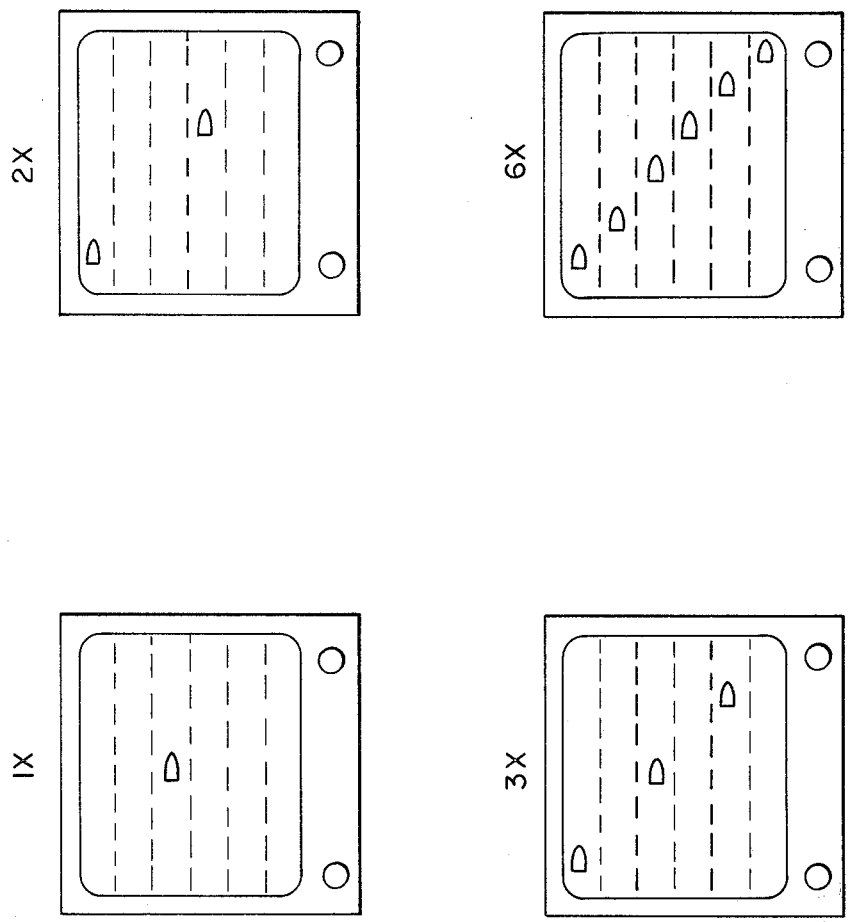
FIG. 8 shows video displays typical of the various partial frame modes of operation.

A partial-frame speed reduction may be produced that is two, three or six times the whole-frame speed reduction, depending upon whether the 2×, 3× or 6× partial-frame mode is selected, respectively. FIG. 8 shows a comparison of video displays for whole-frame, 2×, 3× and 6× modes of operation. In the case of whole-frame operation (1× partial frame mode), blocks 1 through 6 are read out once per frame to produce a single image per frame of an object of interest. In the 2×, 3× and 6× partial-frame modes, certain blocks are read out more than once per frame, thereby producing multiple images per frame of the object of interest. For example, in the 3× partial-frame mode, blocks 3 and 4 are each read out three times per frame with the result that the object of interest is displayed in three locations each corresponding to three different times. The maximum speed reduction is obtained by selecting a whole-frame speed reduction of 33 and the 6× partial-frame mode of operation. In this case, block 3 will be read out six times per frame, thereby producing six corresponding images of the object of interest.

The partial-frame modes of operation are most suited to those applications wherein the object of interest occupies less than a complete frame. Even in those applications, however, wherein the object of interest occupies the entire frame, the partial-frame mode is still useful to examine a portion of the object of interest at a higher speed reduction than the maximum selectable whole-frame speed reduction.

Referring again to FIG. 1, the signal produced by the playback head 64 undergoes signal processing in a preamplifier and equalization circuit 66. The processed signal is then demodulated in an FM demodulator circuit 68. As a result of selecting the various operating parameters as described above, all reproduced signals have the same center frequency and frequency deviation. This condition greatly simplifies circuit design of the FM demodulator 68 since it, like the FM modulator 56, need only operate at a fixed frequency (0.15 MHz). After demodulation, the video signal, which is still in a block format, is converted to a line sequential video signal by a block to serial converter circuit 70 (described in detail in connection with FIG. 12). The demodulated timing signal, on the other hand, is diverted to a timing track reader circuit 72 that extracts the sync information. The extracted sync information is used to control a sync generator circuit 74 that produces a standard sync signal at its output. A sync insert circuit 76 inserts the sync signal into the line sequential video signal from the converter 70 to produce a standard NTSC format video signal, which is displayed on a video monitor 78. The displayed scene information will, as described above, consist of a slow motion replay of the originally recorded scene in accordance with the selected whole-frame speed reduction and partial-frame mode of operation.

The divide-by-N circuit 58 discussed in connection with FIG. 1 is shown in more detail in FIG. 9, which shows the circuit for only a single video channel since all 33 signals (32 video signals and one timing signal) are treated identically. Further, while in the above description it has been assumed that the whole-frame speed reduction will be selected from one of five values (33, 17, 8, 3 and 1), the circuit shown in FIG. 9 is designed to handle up to 256 separate speed reductions. The selected speed reduction is inputted into a PROM (programmable read-only-memory) 88 which produces on its output line the 8-bit binary equivalent of 256 minus "N". The four least significant bits are applied to the load inputs ($L_1$, $L_2$, $L_4$ and $L_8$) of a 4-bit binary counter 92. The four most significant bits are applied to the load inputs ($L_1$, $L_2$, $L_4$ and $L_8$) of a 4-bit binary counter 94. The speed reduction select circuit 48, after a time sufficient to allow the data to settle on the load inputs, produces a LOAD signal that causes each of the counters 92 and 94 to be preset to the count appearing on its respective load inputs. For example, if a speed reduction of 33 was selected (N equals 1, see FIG. 7a), the output of the PROM 88 would be the binary equivalent of 256-1, which is 11111111. The binary counter 92 would thus be preset to 15 (binary 1111), as would the binary counter 94.

The frequency modulated video signal, after conversion to digital form in a frequency to pulse width modulator 90, clocks the binary counters 92 and 94. Initially, the counter 94 is disabled because of the low state of the carry of counter 92. The digital video signal applied to the clock input of the counter 92, however, causes the counter 92 to start counting from its preset (as preset by the prom 88) value up to 15, at which time the carry goes high thereby enabling the counter 94. On the next positive edge transition of the digital video signal, the counter 94 increments one count from the preset count (as preset by the PROM 88), and the carry output of counter 92 returns to its low state, thereby disabling counter 94. This process repeats until the counter 94 counts from its preset value to 15, at which time its carry output goes high on the next clock pulse, and the counters are reloaded to the preset binary count (256-N) appearing on the load inputs. The carry output of the counter 94 toggles a flip flop 97 between high and low states once each nth cycle of the original digital video signal. After conversion back to FM form in a pulse width to frequency converter 98, an FM video signal results which has been reduced in frequency by factor of N relative to the original input video signal. The divide-by-N circuit shown in FIG. 9, therefore, frequency reduces an input signal by a factor of N, wherein N can be any integer value between 1 and 256.

Figure 10:
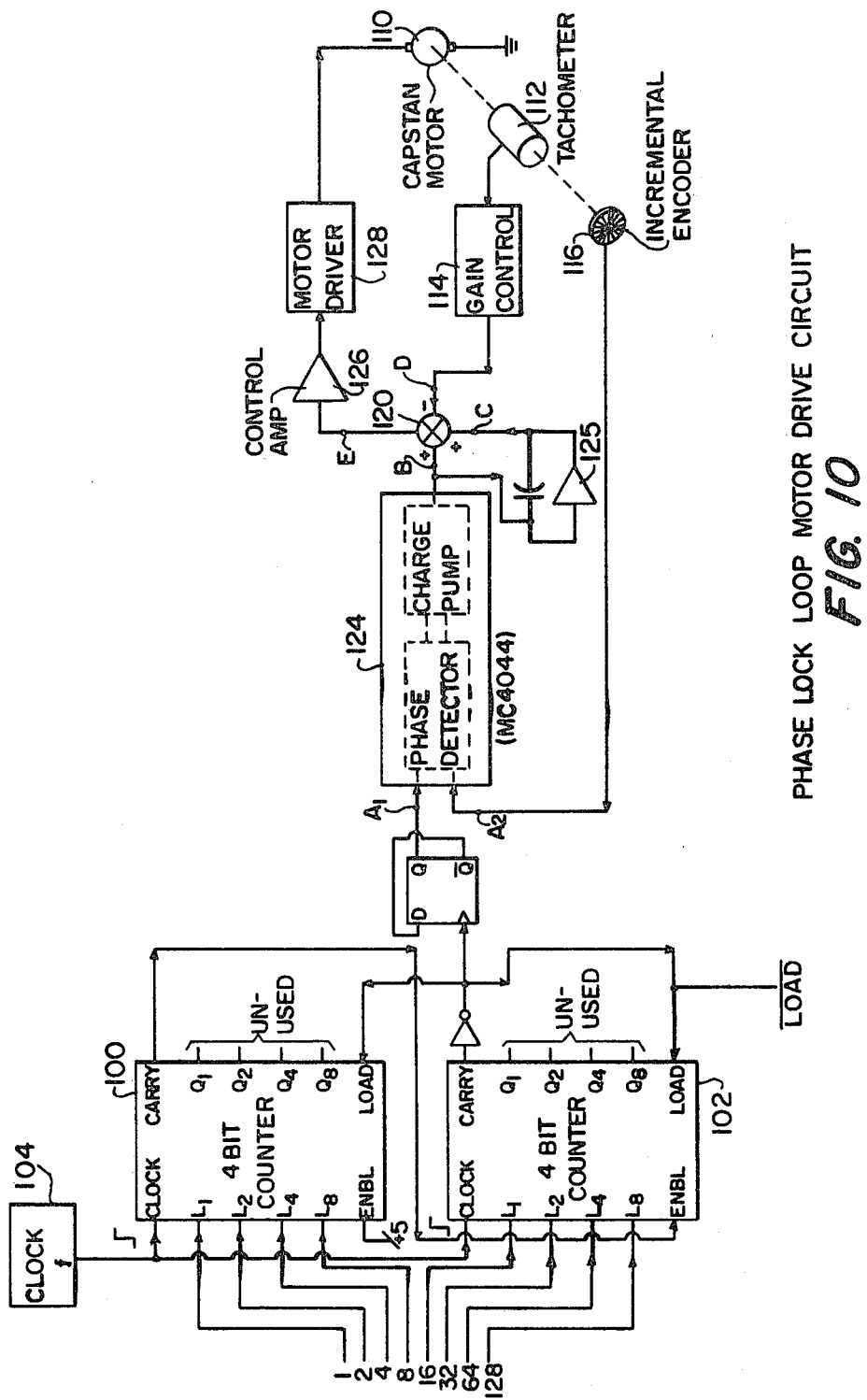
FIG. 10 is a block diagram of a motor drive circuit used in the fast frame recorder shown in FIG. 1.

Selection of the whole-frame speed reduction, as described above, also controls the tape speed at which information is recorded. FIG. 10 shows the motor drive circuit 65 in detail. An 8-bit binary number representing 256 minus "N" (which may be obtained, for example, from the PROM 88 shown in FIG. 9) is applied to a pair of 4-bit counters 100 and 102. Operation of the counters 100 and 102 is identical to that described in connection with the counters 92 and 94 shown in FIG. 9. The only difference is that each of the counters 100 and 102 is driven by a high frequency clock 104, instead of the digital video signal. The output signal appearing at point $A_1$, therefore, consists of a pulse train having a frequency which is less than the clock frequency by a factor of "N". This pulse train is used to control the speed of a capstan motor 110. Connected to the shaft of the capstan motor 110 is a tachometer 112 that produces a signal which varies in amplitude proportionately with motor speed. The signal from the tachometer 112 passes through a gain control circuit 114 and to an inverting input of a summing circuit 120. Also connected to the shaft of the capstan motor 110 is an incremental encoder 116 that produces a pulse train having a repetition rate which varies in proportion to motor speed. A phase-frequency detector 124 (such as an MC4044) compares the phases of the signals appearing at points $A_1$ and $A_2$ and produces an output signal at point B which is applied to the summing circuit 120. The output signal from the phase-frequency detector 124 is integrated by an integrator 125, the output of which is also applied to the summing circuit 120. The output of the summing circuit 120 is amplified by an amplifier 126 and is used to control a motor driver 128.

Figure 11:
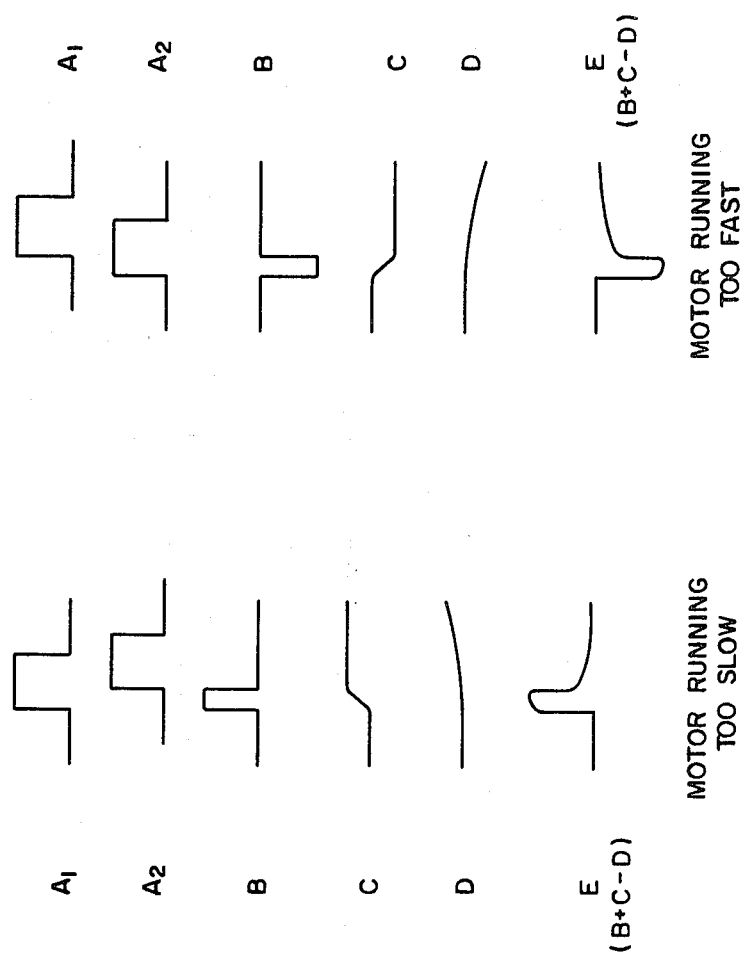
FIG. 11 shows certain waveforms useful in describing the operation of the motor drive circuit shown in FIG. 10.

Referring to FIG. 11, typical waveforms are shown that are representative for two conditions: (1) the motor is running too slow, and (2) the motor is running too fast. In the case where the motor is running too slow, it will be assumed that the signal at $A_2$ lags the signal at $A_1$. The output of the phase-frequency detector 124 at point B is a positive going pulse. This pulse is integrated to produce the waveform shown for point C. The waveform appearing at point D will be a steady state signal until the motor starts to increase in speed. At this point the signal level of the tachometer 112 starts to rise, producing a corresponding increase in the signal at point D. The signal at point E is the result of combining the signals at points B, C and D in the summing circuit 120. The resultant signal causes the motor driver 128 to increase the speed of the capstan motor 110.

In the case where the motor is running too fast, the signal at point $A_2$ leads the signal at point $A_1$. In this case, the phase-frequency detector 124 produces a negative going output pulse at point B. Integration of this pulse produces the waveform shown at point C. The signal appearing at point D is a steady state signal until the motor 110 starts to slow, at which time the tachometer output decreases to produce a corresponding decrease in the signal at point D. The signal at point E is the result of combining the signals at points B, C and D in the summing circuit 120. The resultant signal causes the motor driver 128 to decrease the speed of the capstan motor 110.

Figure 12:
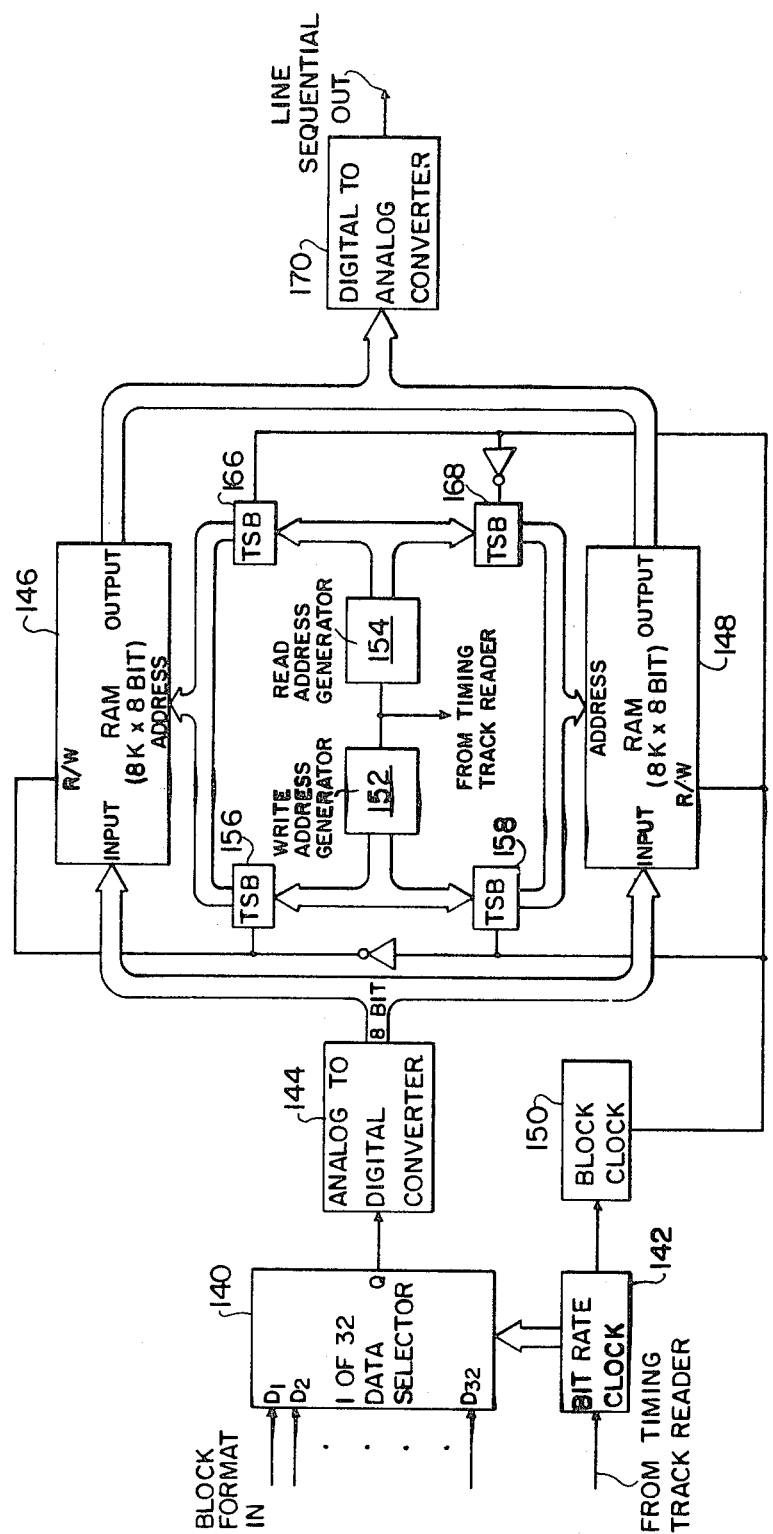
FIG. 12 is a functional block schematic diagram of a format conversion circuit used in the fast frame recorder shown in FIG. 1.

As discussed above, the signal produced upon playback is formatted in blocks, wherein each block contains 32 video line signals. Because conventional video monitors are not compatible with such a block format signal, a block to serial converter circuit 70 (FIG. 1) is used to convert the block format signal to a line sequential signal that is compatible with a standard video monitor (set up to accept a 192 line signal). The block to serial converter circuit 70 is shown in FIG. 12. The block format signal is applied to the input data lines $D_1$ through $D_{32}$ of a 1 of 32 data selector 140. Operation of the data selector 140 is controlled by a bit rate clock 142 that increments its count 32 times as fast as the pixel rate. Assume initially, therefore, that the pixel information corresponding to column 1 of lines 1 through 32 appears on the input data lines $D_1$ through $D_{32}$, respectively. The data selector 140 sequentially routes the signal appearing on each input data line ($D_1$ through $D_{32}$) to the output data line Q at a rate (determined by the bit rate clock 142) which is 32 times faster than the pixel rate of video information. The data selector 140 thus samples all 32 input data lines before the pixel information corresponding to column 2 of lines 1 through 32 appears on the input data lines.

The output signal from the data selector 140 is comprised of a series of analog information bits each of which corresponds to a different pixel of video information. In terms of the corresponding video information, the order of such information bits is as follows: column 1 of lines 1 through 32, column 2 of lines 1 through 32, and so on, to column 248 of lines 1 through 32. The analog information bits are converted to their 8-bit binary equivalent by an analog to digital converter 144. The resulting stream of binary data is applied to the input data busses of a pair of RAMs (Random Access Memories) 146 and 148, each of which is capable of storing the binary data corresponding to one block of video signal. (Because each block contains $248 \times 32 = 7,936$ pixels, $8K \times 8$-bit RAMs are used.)

A write address generator 152 generates the address used to write data into the RAMs 146 and 148. Basically, the write address generator 152 is a counter which increments one count for each increment of the bit rate clock 142, and counts to 7,936 (which is the number of storage locations that are actually used). The write address generator 152 counts sequentially so that input data is stored in sequential storage locations. A pair of tri-state buffers 156 and 158 determine which of the RAMs 146 and 148 receive the write address.

In a similar manner, a read address generator 154 generates a read address used to read data from the RAMs 146 and 148. Again, a pair of tri-state buffers 166 and 168 determine which of the RAMs 146 and 148 receive the read address. There is an important difference between the write address generator 152 and the read address generator 154: While the write address generator 152 counts sequentially, the read address generator 154 counts in such a manner that the signal read from each RAM is in a line-sequential format. This result is accomplished by designing the read address generator 154 so that it repeatedly counts from 1 to 7,936 by 32's until all numbers have been counted. By so counting, block one data, for example, is read from the RAM in the following order: line 1, columns 1 through 248; line 2, columns 1 through 248; ;l and so on, to line 32, columns 1 through 248. This is precisely the order of data that correspoonds to a line sequential signal.

Operation of the tri-state buffers 156, 158, 166 and 168 is controlled by a block clock 150 that causes a block of information to be written into the RAM 146 while a block of information is read from the RAM 148. The next block of information is read from the RAM 146 while the previously written block is written into the RAM 148. As information is read from either of the RAMs 146 or 148, it is converted back to analog form by a digital to analog converter 170 to produce an analog line sequential output signal. This signal, after insertion of sync information, is suitable for video display.

The invention has been described in detail with particular reference to certain preferred embodiments thereof, but it will be understood that variations and modifications can be effected within the spirit and scope of the invention.

What is claimed is:

1. Fast frame recorder apparatus for use in displaying scene information in slow motion on a video monitor, said apparatus comprising:
    (a) a camera operable at a camera whole-frame rate for producing a camera signal representative of a sequence of whole frames of information, said camera being comprised of (1) an area image sensor that is readable in blocks of photosite rows, (2) means for selecting a number of said blocks of photosite rows for readout wherein the total number of blocks divided by said selected number of blocks is an integer N, (3) means for producing successive pluralities of partial frames of information by reading out said selected number of blocks of photosite rows N times for each whole frame of said camera and (4) means for producing a succession of whole frames of information comprised of respective pluralities of partial frames of information;
    (b) means for processing said camera signal to a form suitable for magnetic recording;
    (c) a video monitor having a nominal display frame rate
    (d) magnetic recording means for recording and playing back said processed camera signal, the ratio of the recording tape speed to the playback tape speed being a tape speed reduction ratio that equals the ratio of said camera whole-frame rate to the nominal display frame rate of said video monitor, said played back camera signal being applied to said video monitor to form thereon N temporally displaced, non-interlaced, images corresponding to said selected blocks of photosite rows, said display being a slow motion replay at a partial-frame rate that equals the tape speed reduction ratio multiplied by the number N of partial frames per whole frame.

2. Apparatus for use with an area image sensor of a type that is readable in blocks of photosite rows, a plurality of said blocks of photosite rows being sequentially readable to form a whole frame of information, said apparatus comprising:
    (a) means for selecting for readout a sub-plurality of said blocks of photosite rows;
    (b) means for repeatedly reading out said selected sub-plurality of blocks of photosite rows to produce a stream of information signals respectively representing whole frames of information, said whole frames of information occurring at one or more multiples of a nominal frame rate;
    (c) cathode ray tube (CRT) display means having said nominal frame rate for the display thereof;
    (d) means for converting the frame rate of said stream of information signals to said nominal frame rate; and
    (e) means for applying said converted frame rate information signals to said CRT display means to cause a given number of temporally displaced images corresponding to said selected subplurality of blocks of photosite rows to simultaneously appear, without interlacing, across the display of said CRT display means, the given number of said simultaneously appearing images on said CRT display means corresponding to the number of blocks in said subplurality of blocks divided into the number of blocks in said plurality of blocks, whereby the effective frame rate of the simultaneously appearing images in the display of the CRT display means is said given number of times greater than the nominal frame rate of said CRT display means.

3. Apparatus of claim 2 wherein said frame rate converting means is magnetic recording means for recording and playing back said stream of information signals, the ratio of the recording tape speed to the playback tape speed thereof being a tape speed reduction ratio that equals the ratio of said whole-frame rate to said nominal frame rate.

* * * * *

UNITED STATES PATENT AND TRADEMARK OFFICE
CERTIFICATE OF CORRECTION

PATENT NO. : 4,339,775
DATED : July 13, 1982
INVENTOR(S) : James U. Lemke and James A. Bixby It is certified that error appears in the above-identified patent and that said Letters Patent are hereby corrected as shown below:

Column 3, line 18, "times" should read --frames--.
Column 4, line 29, "mulitplexer" should read --multiplexer--.
Column 7, line 15, "into" should read --onto--.
Column 8, line 30, "line" should read --lines--; and
  line 52, "prom" should read --PROM--.
Column 10, line 62, "248; ;1 and" should read --248; and--;
  and line 64, "correspoonds" should read --corresponds--.

Signed and Sealed this

Twenth-eighth Day of September 1982

[SEAL]

Attest:

GERALD J. MOSSINGHOFF

Attesting Officer

Commissioner of Patents and Trademarks